United States Patent [19]

Ide et al.

[11] Patent Number: 4,818,987
[45] Date of Patent: Apr. 4, 1989

[54] SELECTIVE PAGING RECEIVER WITH MESSAGE DISPLAY

[75] Inventors: Motoki Ide; Takashi Oyagi, both of Tokyo, Japan

[73] Assignee: NEC Corporation, Japan

[21] Appl. No.: 942,603

[22] Filed: Dec. 17, 1986

[30] Foreign Application Priority Data

Dec. 18, 1985 [JP] Japan ................ 60-282726

[51] Int. Cl.$^4$ ............................. H04Q 1/00
[52] U.S. Cl. .................... 340/825.47; 340/825.44; 340/825.48; 455/38
[58] Field of Search ............... 340/825.44, 825.48, 340/825.47, 311.1, 825.52; 455/343, 31, 38; 379/56, 57

[56] References Cited

U.S. PATENT DOCUMENTS

| | | | |
|---|---|---|---|
| 4,369,443 | 1/1983 | Giallanza et al. | 340/825.44 |
| 4,398,192 | 8/1983 | Moore et al. | 340/825.44 |

FOREIGN PATENT DOCUMENTS

| | | | |
|---|---|---|---|
| 0138202 | 12/1978 | Japan | 455/38 |
| 0041045 | 3/1982 | Japan | 379/56 |
| 0170342 | 9/1985 | Japan | 455/31 |
| 2086106A | 5/1982 | United Kingdom . | |
| 2144565 | 3/1985 | United Kingdom | 340/825.44 |

*Primary Examiner*—John W. Caldwell, Sr.
*Assistant Examiner*—Edwin C. Holloway, III
*Attorney, Agent, or Firm*—Laff, Whitesel, Conte & Saret

[57] ABSTRACT

A selective paging receiver with message display has a receiver section, a number setting circuit, a paging number detector, and a display panel. The receiver section receives paging signals sent to the paging receiver, and recovers a paging number data signal and a message data signal from the paging signals. The message data signal includes both individual message data for the paging receiver, and common message data for the paging receiver in common with a preselected group of similar receivers. A number setting circuit assigns both a preselected individual paging number and a preselected common paging number to the receiver. The paging number detector searches for the individual paging number in a particular group time frame of the paging number signal. This time frame corresponds to a paging receiver group to which the paging receiver belongs. The paging number detector conducts a parallel search for the common paging number without regard for the particular group time frame. Upon detection of the individual paging number, the paging number detector outputs an individual detection signal. Upon detection of the common paging number, the paging number detector outputs a common detection signal. The display responds to the individual detection signal by displaying the contents of the individual message data and responds to the common detection signal by displaying the contents of the common message data.

12 Claims, 5 Drawing Sheets

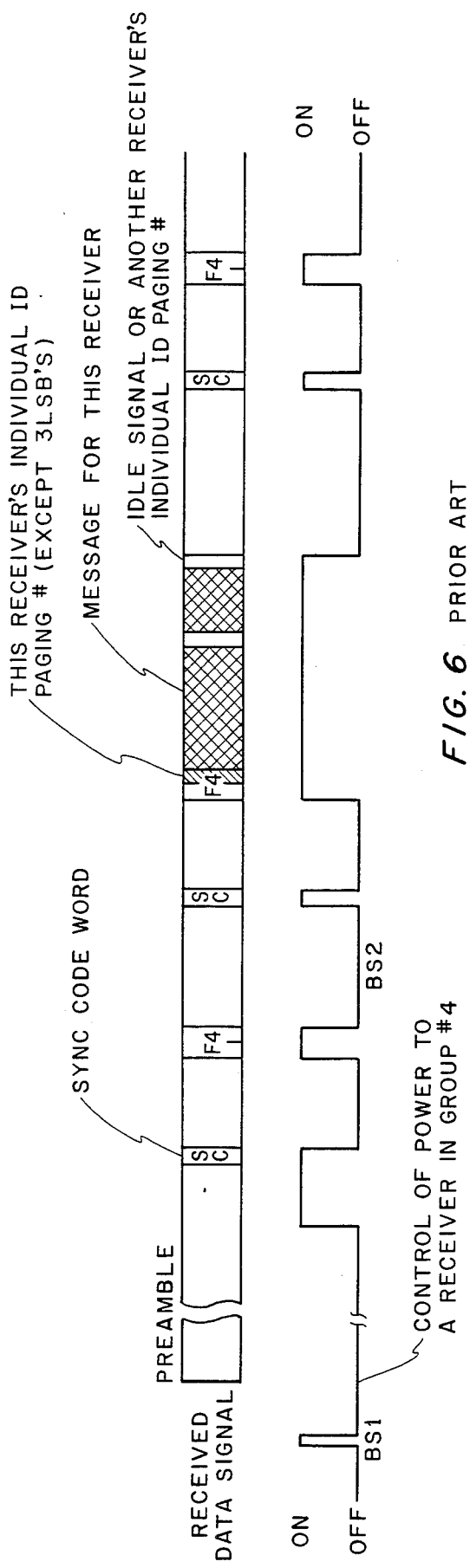

SELECTIVE PAGING RECEIVER WITH MESSAGE DISPLAY

This invention relates to a miniature portable selective paging receiver that can selectively receive a paging message by radio from a base station, and more particularly to such a receiver equipped with a message display.

Radio paging services that simply signal a subscriber carrying a paging receiver or "beeper" that he should get in touch with a specific place, such as his office or home, have been popular for some time. More recently, new services using advanced equipment to transmit actual message information to subscribers have appeared.

Such new services are not limited to paging, or sending information to, subscribers individually. These services also provide such things as sending a particular message to several subscribers at once, or sending information of general interest to all subscribers who have asked to receive it.

A selective paging receiver having a display panel for displaying messages to the user is called a "display pager". One type of conventional display page is provided with two different identification or paging numbers, an individual ID paging number and a group paging number. When a group of subscribers have arranged for a common group paging number for their pagers, each member receives any paging message sent out under the group paging number. It is also possible to send a message to all members of a particular group without members of the other groups knowing, if a common paging number is assigned to only the receivers in the particular group. To reach any member of the group individually, the paging message is sent out under the individual ID paging number of that member's pager.

In this type of group/individual display pager, two modes of battery saving operation are used to decrease the power consumption of the display pager and to reduce the number of data bits in the identification number.

Before sending any paging messages, the base transmitter sends a preamble signal of alternating 1's and 0's. Therefore, in the first battery saving mode (BS1) the power to the receiver circuits is normally turned off except during a certain time interval necessary for a detection of a preamble signal sent from the base transmitter.

When the pager detects a preamble signal, it moves to the second battery saving mode of operation (BS2). For this mode the display pagers of a particular paging service are divided into certain groups by their individual ID paging numbers. The British Post Office has established a public standard for this called the POCSAG (Post Office Code Standard Advisory Group) transmission protocol. In a POCSAG system the ID paging numbers are divided into eight groups.

Following a detection of the preamble signal, paging transmission occurs in a batch. Each batch includes seventeen data words the first word of which is a 32-bit frame sync signal. The remaining sixteen data words are grouped in pairs into eight successive frames, one frame for each group.

In the second battery saving mode, the power to the receiver circuits is on during a time interval corresponding to the frame of the one group to which the pager in question belongs and off during the seven frames of the other groups.

Each pager is given a unique binary ID paging number, the three least significant bits (3 LSB's) of which (000 through 111) indicate to which of the eight groups of pagers it belongs. But since the transmissions for pagers of different groups are sent in different frames, to identify a pager the three least significant bits of its ID paging number need not be transmitted.

Therefore, eight groups have the same ID paging numbers which are written in binary. If written in decimal, these ID paging numbers appear as follows, where $n=0, 1, 2, \ldots, N$:

| GROUP I | GROUP II | GROUP III | GROUP IV | GROUP V | GROUP VI | GROUP VII | GROUP VIII |
|---|---|---|---|---|---|---|---|
| $8n$ | $8n+1$ | $8n+2$ | $8n+3$ | $8n+4$ | $8n+5$ | $8n+6$ | $8n+7$ |

For example, the individual ID paging numbers of the receivers in Group I are 0, 8, 16, 24, etc. When expressed in binary using five bits, these ID paging numbers are 00000, 01000, 10000, 11000, etc. This illustrates the general rule that all the individual ID paging numbers of receivers in Group I have "000" as the three least significant bits.

Similarly, the individual ID paging numbers of the receivers in Group II are 1, 9, 17, 25, etc. When expressed in binary using five bits, these ID paging numbers are 00001, 10001, 11001, etc. Thus, all the individual ID paging numbers of receivers in Group II has "001" as the three least significant bits.

As previously mentioned, the three least significant bits "000" in Group I and "001" in Group II are not transmitted. Instead, other bits "00", "01", "10", "11", etc, which are the binary expressions of $8n$ are transmitted for Groups I and II. Thus, Groups I and II have the same ID paging numbers, such as "00", "01", "10", "11", etc. The other Groups II to VIII also have the same ID paging numbers $8n$. Each group is distinguished by its own time for transmission or transmission frame. While each pager has its own unique ID paging number, within each group the individual pagers can be distinguished by just the value of the integer n.

In this arrangement receivers of different groups cannot be given a common group paging number, since they belong to different frames. A paging service using the POCSAG protocol will find that the ID numbers divide the pagers into eight convenient groups. All of the receivers within a POCSAG group can easily receive a common paging message because their receivers are "ON" during the same frame of the transmission signal.

Because of the battery saving operation, this type of conventional display receiver only is turned on to receive ID number during the frame provided for the group to which it belongs. Therefore, if the subscribers who wish to receive the same message following the common paging number are in more than one group, the base transmitter must use the appropriate frames to repeat the message for each group in which there are such subscribers. With the POCSAG protocol, in the worst case the message will have to be repeated as many as eight times, reducing the efficiency of the base transmitter.

As the number of subscribers in different groups grows, the transmitting burden on the base station for such general messages increases, lowering the overall efficiency of the paging system. Therefore, the conventional system has the disadvantage of limiting the number of different subscribers that can be easily accommodated.

Accordingly, an object of this invention is provide a new and improved selective paging receiver with message display. A more particular object is to provide a paging receiver that can receive common messages transmitted for any similar receiver in the system as well as individual messages transmitted only for the individual receiver concerned.

Yet another object is to provide such a paging receiver for a system protocol that divides a plurality of paging receivers into receiving groups, each of which has a corresponding dedicated time frame for receiving paging signals, without limiting the availability of a common message transmission to one group at a time.

In keeping with one aspect of the invention, a selective paging receiver with message display has a receiver section, a paging number setting circuit, a paging number detector, and a display panel. The receiver section receives paging signals sent to the paging receiver. It recovers a paging number data signal and a message data signal from the paging signals. The message data signal includes individual message data for the paging receiver It also includes common message data for the paging receiver in common with a preselected group of similar receivers.

The paging number setting circuit assigns both a preselected individual paging number and a preselected common paging number to the receiver. The individual paging number also designates a preselected group to which the paging receiver is assigned. The paging number detector is adapted to search for the individual paging number in a particular group time frame of the paging number signal. This group time frame is one dedicated to the designated paging receiver group of the paging receiver. The paging number detector also conducts a parallel search for the common paging number without regard for the particular group time frame.

Upon detecting the individual paging number, the paging number detector outputs an individual detection signal. Upon detecting the common paging number, the paging number detector outputs a common detection signal. The display responds to the individual detection signal by displaying the contents of the individual message data and responds to the common detection signal by displaying the contents of the common message data.

BRIEF DESCRIPTION OF THE DRAWINGS

The above mentioned and other features of this invention and the manner of obtaining them will become more apparent, and the invention itself will be best understood, by reference to the following description of an embodiment of the invention taken in conjunction with the accompanying drawings, in which:

FIG. 6 is a timing chart for explaining the operation of a prior art battery saving technique for a paging receiver; and FIG. 7 is a timing chart for explaining the operations of a battery saving technique and a paging number detector employed in the receiver of FIG. 1.

A prior art battery saving technique for a paging receiver uses different signal frames for a base transmitter to communicate with paging receivers of different groups. The typical signal received at the paging receiver, shown in FIG. 6, follows the POCSAG standardized signal format shown in FIG. 5A. In this format the POCSAG receiver ID paging number data and message data are encoded into 32-bit receiver ID words and message words as shown in FIG. 5 B.

The received signal has a preamble portion composed of at least 576 alternating bits of 1 and 0. When the prior art receiver detects the preamble signal, it exits the first battery saving mode. This enables the receiver to receive the 32-bit frame sync signal SC which follows the preamble signal. Having synchronized itself with the incoming signal, the receiver enters the second battery saving mode, in which it is enabled to receive further signals only during the frame interval for the POCSAG group to which the receiver belongs. Upon detecting its individual ID paging number during the frame for its group, the receiver remains on in order to continuously receive the message which follows its ID paging number until the message terminates.

Figure 1:
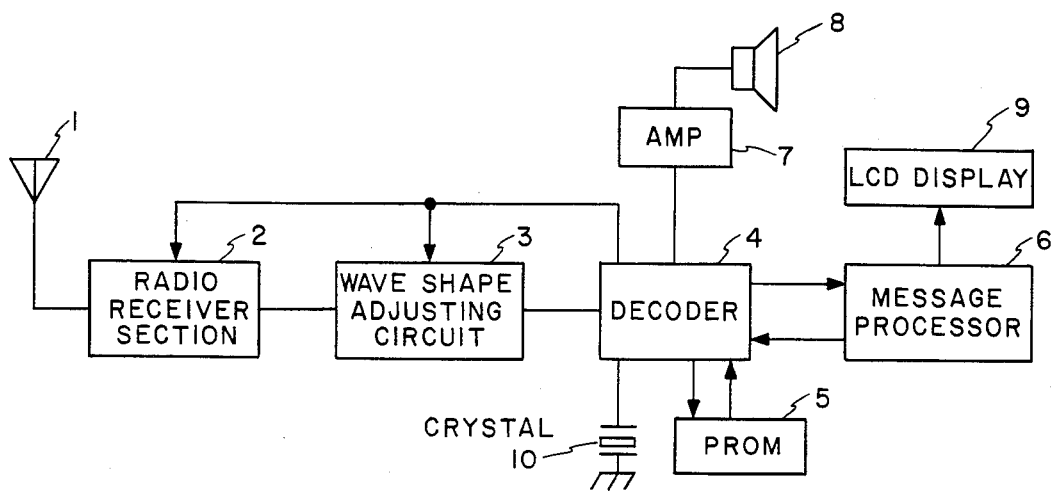
FIG. 1 is a block diagram of an embodiment of a selective paging receiver with message display incorporating the principles of the invention.

The battery saving technique employed in the inventive receiver of FIG. 1 has first and second battery saving modes as shown in FIG. 7. The second battery saving mode distinguishes between a search for a common paging number and a search for the pager's individual paging number.

The first battery saving mode is similar to that used in the prior art technique of FIG. 6. When the preamble signal is detected, the receiver remains on to look for a 32-bit frame sync signal SC. However, after synchronizing itself, the inventive receiver does not enter a conventional second battery saving mode. Instead, ignoring the three least significant binary bits of its individual ID paging number, a portion of its circuitry continues to receive the transmitted signal and searches among all the frames for a group paging number. If such a group paging number is found, the receiver loads in the corresponding group message.

In addition to group messages, the receiver can also receive an individual message if its individual ID paging number is sent. However, the receiver's individual ID paging number can only be distinguished in the frame of its group. This is because the same individual ID paging number appears in the frames of the other groups. Therefore, to detect the individual ID paging number, the receiver has to search only the signals received in the frame of the group to which it belongs, much as the prior art receiver does.

FIG. 1 shows a block diagram of an embodiment of a selective paging receiver with message display incorporating the principles of the invention. Radio signals from the base transmitter are picked up by an antenna 1 and fed to a radio receiver section 2. The receiver section 2 recovers a digital paging signal having a shape which is adjusted by a wave shape adjusting circuit 3 before being input to a decoder 4. A programmable read only memory (PROM) 5 stores information for the decoder, such as the receiver's individual ID paging number. To produce clock pulses, the decoder has an internal oscillator (not shown in FIG. 1) controlled by a frequency regulating crystal 10.

The decoder output is fed to message processor 6 which displays message information to the user by controlling a liquid crystal display 9. The decoder can also generate an audio output by means of a speaker 8, driven by a buffer amplifier 7.

Figure 2:
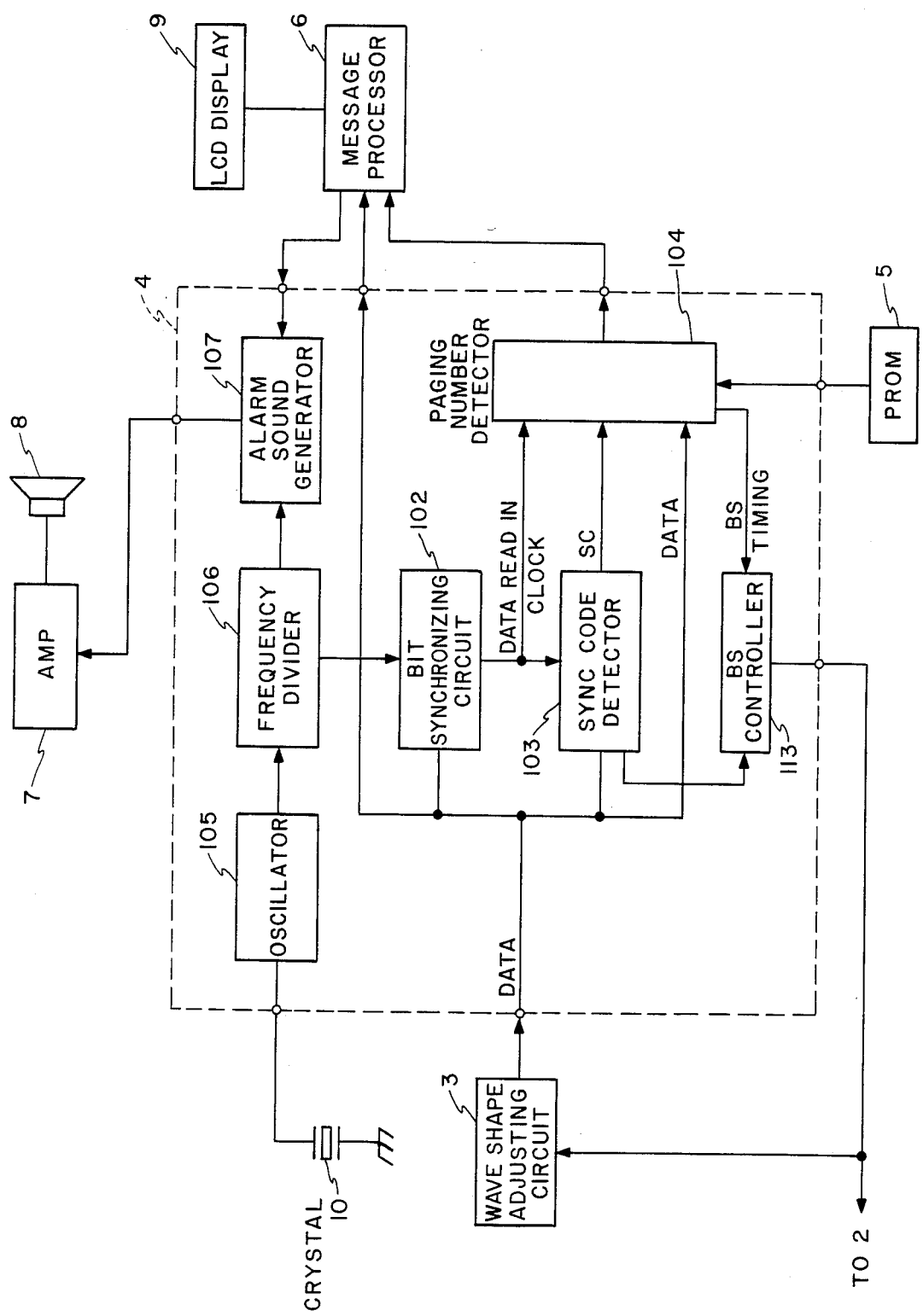
FIG. 2 is a more detailed block diagram of a decoder shown in FIG. 1, together with circuits that interact with it.

FIG. 2 shows a more detailed block diagram of decoder 4 of FIG. 1, together with circuits that interact with it. Decoder 4 sequentially reads in the digital DATA signal from the wave shape adjusting circuit. An oscillator 105, controlled by the frequency regulating crystal 10, generates clock pulses which are frequency divided by a frequency divider 106 before being used as clock pulses for a bit synchronizing circuit 102.

Bit synchronizing circuit 102 gets into sync with the bits of the DATA signal and generates data read clock pulses for reading in the DATA signal. A sync code detector 103 uses the read clock pulses from synchronizing circuit 102 to act as both a sync detector for the frame sync signal SC and a preamble detector for the preamble signal.

The receiver's preselected individual receiver ID paging number is stored in a receiver number designating circuit (PROM 5). A paging number detector 104 compares this preselected number with the bits of the received DATA signal.

The output of frequency divider 106 is also used as a frequency input for an alarm sound generator circuit 107.

Figure 3:
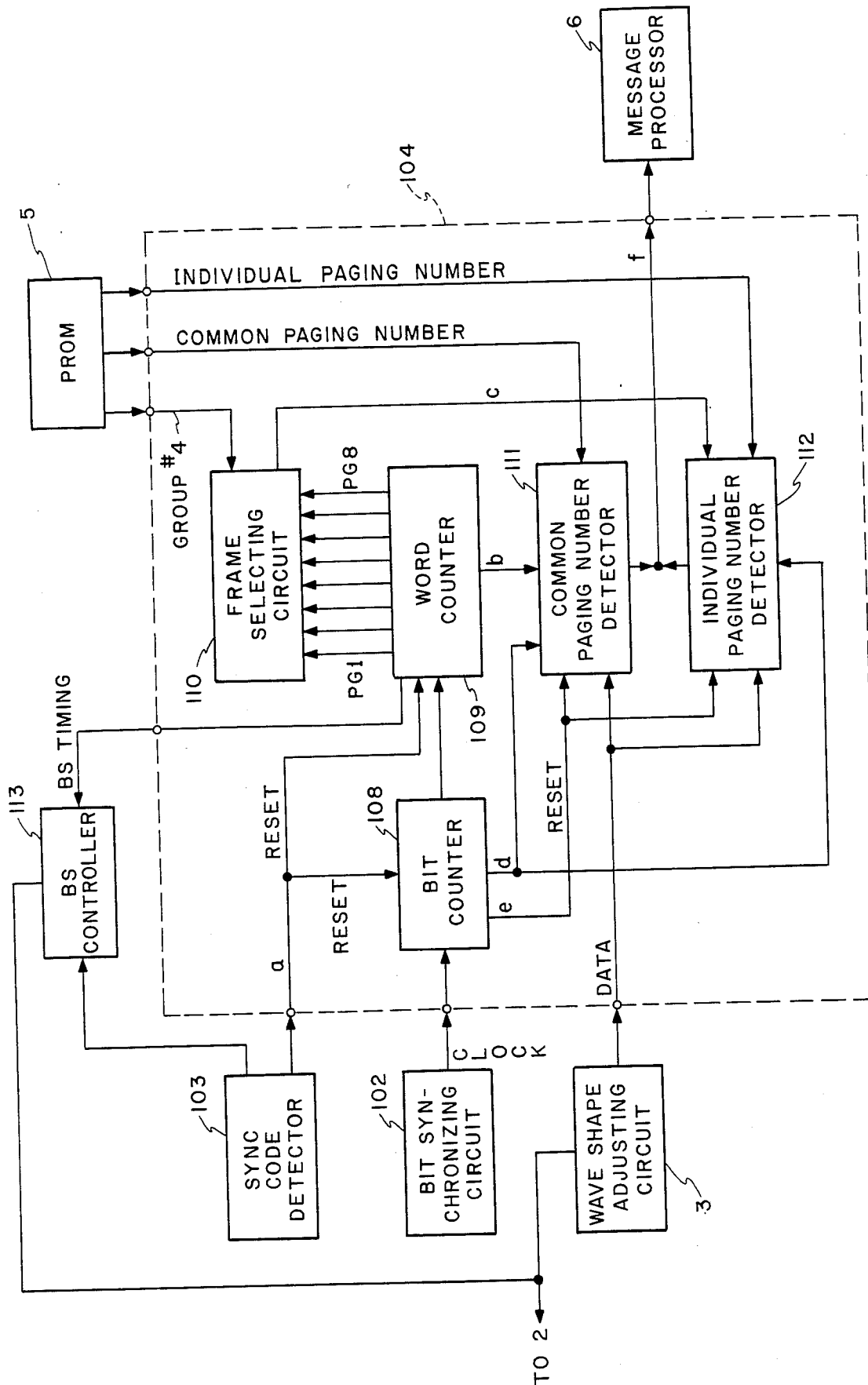
FIG. 3 is a more detailed block diagram of a paging number detector shown in FIG. 2, together with circuits that interact with it.

FIG. 3 shows a more detailed block diagram of the paging number detector 104 of FIG. 2, together with circuits that interact with it. The frame sync signal SC is detected by sync code detector 103, which sends out a synchronizing RESET pulse on line a to a bit counter 108 and a word counter 109.

An important feature of the invention is the battery saving (BS) operation of radio receiver section 2 and wave shape adjusting circuit 3. In FIG. 1, the decoder 4 controls the power supply of radio receiver section 2 and wave shape adjusting circuit, as shown in FIG. 7. In FIG. 2, BS controller 113 turns on and off the receiver section 2 and the adjusting circuit 3, at an interval of seventeen words during the first battery saving mode, in response to a BS timing signal which is received from a paging number detector 104. When sync code detector 103 detects a preamble and an SC signal, the BS controller 113 turns on the section 2 and the circuit 3. Then it keeps them turned-on until the sync code detector 103 finds no sync code word on two successive occasions, as shown in FIG. 7. In FIG. 3, the word counter 109 provides the BS timing signal to the BS timing signal to the BS controller 113.

Figure 5A:
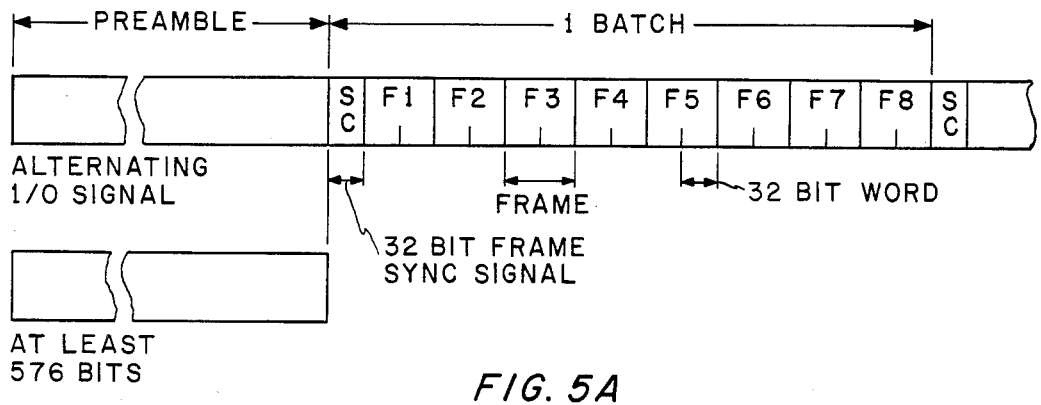
FIG. 5A is a chart of the format of a standardized signal used in selective paging receivers.
Figure 5B:
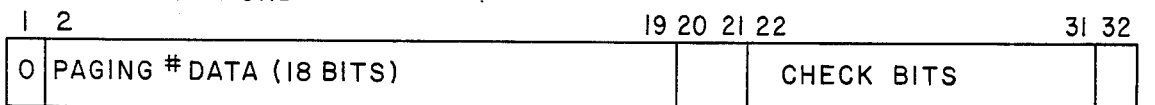
FIG. 5B is a chart of a standardized encoding format for sending receiver ID paging number information and message data used in the selective paging receivers.
Figure 5B:
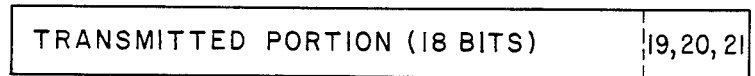
Figure 5B:
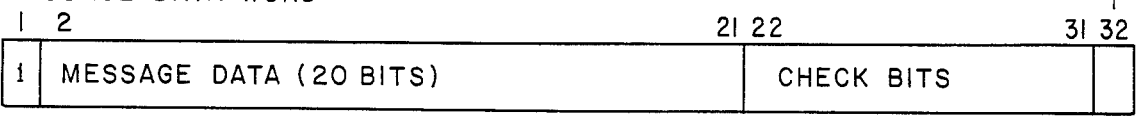

As shown in FIGS. 5A there are 32 bits in a ID paging number data word or message data word. As shown in FIG. 5A, following the preamble signal, paging transmission occurs in a batch of seventeen words.

Therefore, bit counter 108 of FIG. 3, which receives the data read clock pulses from bit synchronizing circuit 102, is arranged to count 32 clock pulses and then output a word pulse to word counter 109. Word counter 109 is arranged to count the seventeen word pulses which make up a transmission batch.

As shown in FIG. 5A, the first word of a transmission batch is the frame sync signal SC. The remaining sixteen data words are grouped in pairs into eight successive frames, one frame for each group. As word counter 109 counts through the sixteen words associated with the eight frames, it correspondingly outputs pager group timing pulses PG1, PG2, ..., PG8 to indicate the group to which the current frame belongs.

The particular pager's individual ID paging number is stored as a binary number in PROM 5. A frame selecting circuit 110 reads in the three least significant bits of this number as the pager's group paging number. Then, in accordance with the group paging number, circuit 110 selects the appropriate timing pulse from among PG1, PG2, ..., PG8 to indicate by an output signal c when the frame for the pager's group appears in the transmission batch. This normally low signal c goes high when the frame appears. Signal c is output to an individual ID paging number detector 112.

FIG. 3 shows an example in which the particular pager belongs to pager group #4. Therefore, in FIG. 4 signal c is only high in the time interval after the frame sync signal SC corresponding to frame F4, the fourth frame.

A common paging number detector 111 receives the digital DATA signal as input and searches for a match, in the frame of any group, with a common paging number stored in PROM 5.

At the same time, the individual ID paging number detector 112 receives the digital DATA signal as input and searches, during the frame for the pager's group as indicated by signal c, for a match with the pager's individual ID paging number (less the three significant bits) as stored in PROM 5.

The receiver proceeds as follows. As previously mentioned, sync code detector 103 acts as both a sync detector for the frame sync signal SC and a preamble detector for the preamble signal. When the preamble signal is detected, the receiver exits the first battery saving mode in which only the preamble signals are received. The receiver remains on to look for frame sync signal SC.

Figure 4:
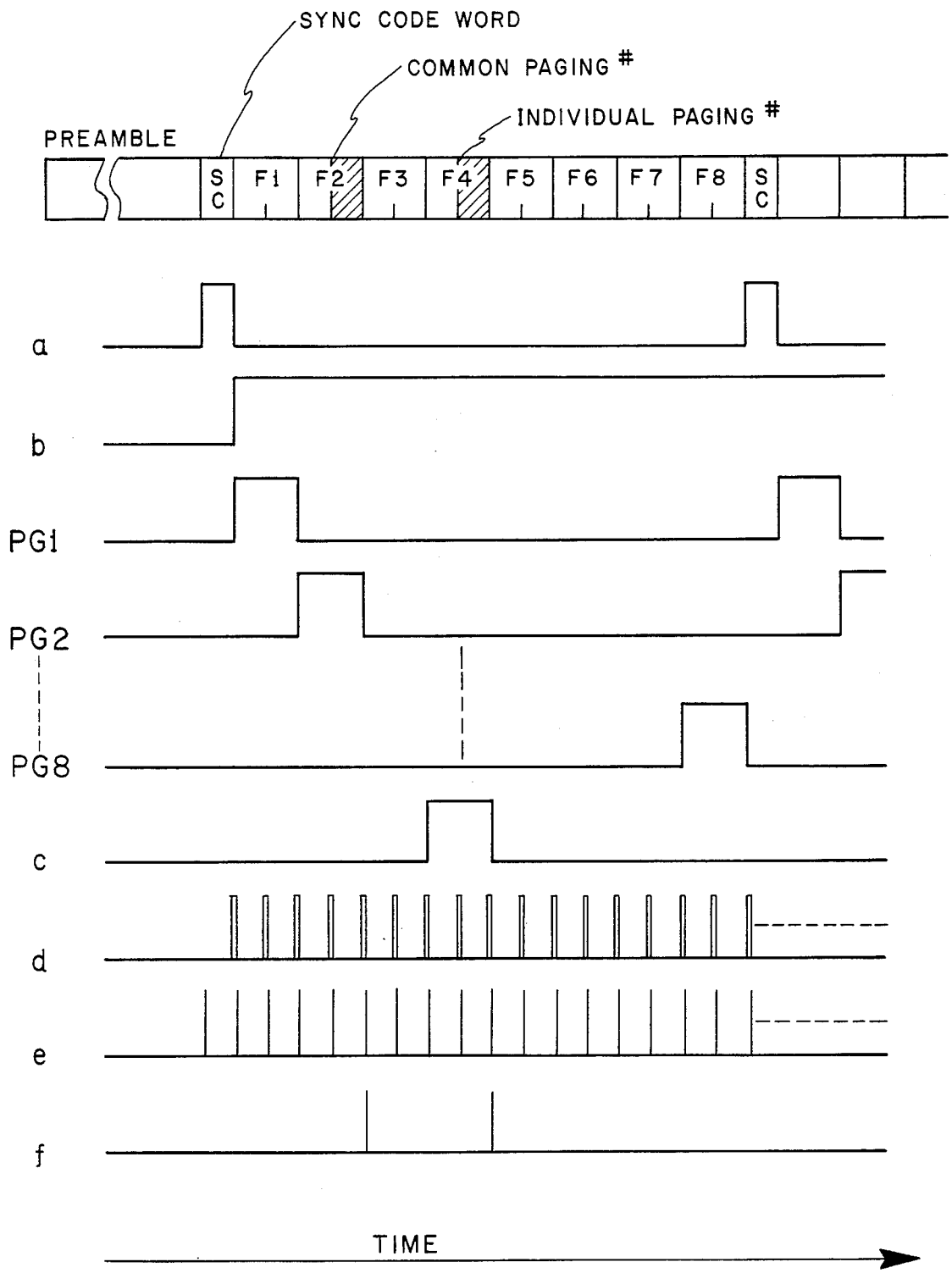
FIG. 4 is a timing chart for explaining the operation of the paging number detector of FIG. 3.

As shown in FIG. 4, when sync code detector 103 detects frame sync signal SC, its output signal a goes high, resetting bit counter 108 and word counter 109. In accordance with clock timing pulses from bit synchronizing circuit 102, bit counter 108 reads in the DATA signal output by wave shape adjusting circuit 3. When bit counter 108 has counted that 32 bits of the DATA signal have been received, it sends a word pulse to word counter 109 and at the same time sends a timing pulse d to common paging number detector 111 and individual ID paging number detector 112.

If either a common paging number or the pager's individual ID paging number is detected, a pulse appears thereafter in output signal f to message processor 6. In the example of FIG. 4, a common paging number appears in the second word of frame F2 and an individual ID paging number appears in the second word of frame F4. However, both of them can also appear in the first word of the frame, if desired. The detection of these paging numbers is shown in signal f, which has a pulse corresponding to each detection. In each case, immediately thereafter, a corresponding pulse in signal e from bit counter 108 is used to reset detectors 111 and 112.

When sync code detector 103 detects frame sync signal SC, a reset pulse is output in signal a to reset word counter 109. This causes an output control signal b of counter 109 to go high, enabling common paging number detector 111. Counter 109 also then begins outputting, in order, pager group timing pulses PG1–PG8, each of which is high for a corresponding frame interval of the DATA signal.

Frame selecting circuit 110 reads in the particular receiver's group number from PROM 5. Selecting circuit 110 uses the group number to select the corresponding timing pulse for that group's frame from among the group timing pulses PG1–PG8. The selected group timing pulse is output to individual ID paging number detector 112 as a corresponding enable pulse in an output signal c.

In the example of FIG. 3, the group number in PROM 5 is for receiver group #4. Therefore, common paging number detector 111 and individual ID paging number detector 112 are respectively activated by timing control signals b and c shown in FIG. 4. Detectors 111 and 112 act in parallel to compare the DATA signal with a common paging number and the pager's individual ID paging number, both of which are stored in PROM 5.

If either of these paging numbers is detected, a corresponding pulse is output in signal f to message processor 6, at a time as determined by a corresponding timing pulse which is produced in output signal d by bit counter 108. This enables message processor 6 to process the message data which follows the paging number for display to the user.

In the inventive receiver, once a preamble pulse is detected, battery power is continuously provided to those receiver circuits monitoring successive batches for a common paging number.

Therefore, if sync code detector 103 is unable to detect frame sync signal SC on two successive occasions when it should have appeared, the receiver can be set to automatically return to the first battery saving mode. In this mode the receiver circuits are on only during the time which is necessary to receive and detect preamble signals.

The inventive pager has a paging number detector circuit that searches in parallel for both a common paging number and an individual ID paging number. It searches for the common paging number in the frames of all the groups, but searches for the individual ID paging number only in the frame of the group to which the pager belongs.

The paging number detector circuit detects the common paging number regardless of the pager's individual ID paging number, thus enabling the pager to receive the corresponding common message in the frame of any group. However, it only detects the individual ID paging number when it appears in the frame of the group to which the pager belongs.

This reduces the transmission burden on the base transmitting station and increases the paging system's overall efficiency. These improvements are of great benefit since they enable the number of subscribers to be greatly increased.

Those who are skilled in the art will readily perceive how to modify the invention. Therefore, the appended claims are to be construed to cover all equivalent structures which fall within the true scope and spirit of the invention.

The invention claimed is:

1. A selective paging receiver with message display, comprising:

a receiver section for receiving paging signals sent to the paging receiver and for recovering a paging number data signal and a message data signal from them, the message data signal including individual message data for said paging receiver and common message data for said paging receiver in common with a preselected group of similar receivers, said group of receivers being identified by a group time frame;

number setting means for assigning to the receiver both a preselected individual paging number which includes designation of a preselected paging receiver group, and a preselected common paging number;

paging number detector means for simultaneously comparing both said individual paging number with the recovered paging number data signal in a particular group time frame corresponding to the designated group of said paging receiver, and said common paging number with the recovered paging number data signal in a time interval not limited to said particular group time frame, and for outputting an individual match signal in response to a detection of said individual paging number and for outputting a common detection signal in response to a match of said common paging number; and display means responsive to the individual detection signal for displaying the contents of the individual message data and responsive to the common detection signal for displaying the contents of the common message data.

2. A paging receiver for use in a system which transmits signals to both individual paging receivers and groups of said paging receivers, each of said paging receivers being identified by an individually assigned number which contains both individual and group identification, said signals including individual message data associated with numerical designations for identifying individual paging receivers and group message data associated with a common message number for a group of paging receivers, said signals being sent to said paging receivers in cyclically recurring time frames which are dedicated to identify and designate each of the groups, each of said paging receivers being within an associated group, each of said paging receivers comprising means at each of said paging receivers for receiving said signals, detector means for searching through said received signals for the number which identifies a time frame of a group containing the searching paging receiver and for simultaneously searching for both the number which is individual to the searching paging receiver during the identified time frame containing said searching receiver and for a group time frame containing a common message number for the paging receiver without regard to the time frame of the group containing the paging receiver, and means responsive to a detection of a number identifying either the paging receiver or the common message number for displaying the message associated with the detected numerical designation.

3. The paging receiver of claim 2 wherein said numerical designations for identifying paging receivers include at least one bit of lesser significance for identifying the group, and said detector means comprises means for storing the numerical designation identifying the individual receiver in a memory, means for comparing received signals with the stored designation, means for counting data words in said signal as it is received, and means for responsive to said word count for identifying the group of paging receivers to which said individual message data is directed.

4. The paging receiver of claim 3 and means associated with said detector means for reading three least significant bits in said numerical designation and responsive thereto identifying the group time frame to which the paging receiver belongs, and means responsive to the read out of said least significant bits for identifying the individual paging receiver in the group which is being signaled.

5. The paging receiver of claim 4 and means responsive to said identification of said group for searching for a numerical match within said time frame dedicated to that identified group.

6. The paging receiver of claim 5 wherein said frames are identified by frame sync signals, and means responsive to a succeeding frame sync signal for canceling said search for a numerical match.

7. The paging receiver of claim 5 wherein said signals include a sync signal and a preamble signal, there being at least two modes for energizing said paging receiver, and means for detecting both a sync signal and said preamble, and means responsive to said detection of said preamble signal for switching an energization mode for said receiver and going into a search for said sync signal mode.

8. The paging receiver of claim 7 and means responsive to a failure to detect two successive frame sync signals for canceling the switched energization mode.

9. A paging receiver comprising means for receiving and decoding message signals associated with multibit numerical signals for individually identifying said paging receiver, said multibit numerical signals being sent in cyclically recurring time frames, each of said signals including at least one bit for identifying a particular time frame which is dedicated to a group-call group of said paging receivers to which said paging receiver belongs, first means responsive to the receipt of said signals in each of said cyclically recurring time frames for searching for the time frame dedicated to the group to which said paging receiver belongs, means responsive to a detection of said dedicated time frame for searching for the numerical signal which individually identifies said paging receiver, second means responsive to the receipt of said signals for searching through all of said time frames for a different numerical signal indicating the presence of a common message number, said first and second means operating simultaneously during at least part of said searching, and means responsive to a detection of said dedicated time frame and said individual numerical signal for displaying a message directed to an individual paging receiver and responsive to said different signal for displaying a common message.

10. The paging receiver of claim 9 and means for selectively energizing said paging receiver in either a low level battery saving mode or a high level operating mode, said cyclically recurring time frames having individually associated sync pulses, message signals having a preamble signal, and means responsive to said preamble signal and the sync pulse of said dedicated time frame for switching said paging receiver to said high level mode.

11. The paging receiver of claim 10 and means responsive to a failure to detect two successive frame sync pulses for switching said paging receiver to said low level mode.

12. A paging receiver comprising:
receiver means for receiving a paging signal including an individual paging number which is assigned to said receiver and a common paging number which is assigned at least to said receiver, said paging signal being transmitted in cyclically recurring time frames;
decoder means for simultaneously searching the received paging signal both for said individual paging number in a particular group time frame corresponding to the designated group of said paging receiver and said common paging number in a time interval not limited to said particular group time frame, and for outputting an individual detection signal in response to a detection of said individual paging number and for outputting a common detection signal in response to a detection of said common paging number; and
indicating means responsive to one of said individual and common detection signals for indicating the reception of either said individual or common paging numbers.

* * * * *